United States Patent
Zhu

(10) Patent No.: US 12,238,797 B2
(45) Date of Patent: Feb. 25, 2025

(54) MULTI-NETWORK ACCESS METHOD AND TERMINAL DEVICE

(71) Applicant: VIVO MOBILE COMMUNICATION CO., LTD., Guangdong (CN)

(72) Inventor: Mengqiang Zhu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 346 days.

(21) Appl. No.: 17/701,481

(22) Filed: Mar. 22, 2022

(65) Prior Publication Data

US 2022/0217799 A1 Jul. 7, 2022

Related U.S. Application Data

(63) Continuation of application No. PCT/CN2020/115285, filed on Sep. 15, 2020.

(30) Foreign Application Priority Data

Sep. 26, 2019 (CN) .......................... 201910918667.2

(51) Int. Cl.
  *H04W 76/15* (2018.01)
  *H04W 84/12* (2009.01)
  *H04W 88/06* (2009.01)

(52) U.S. Cl.
  CPC ............ *H04W 76/15* (2018.02); *H04W 84/12* (2013.01); *H04W 88/06* (2013.01)

(58) Field of Classification Search
  CPC ..... H04L 63/0272; H04L 43/16; H04L 76/15; G06F 9/50; H04W 76/115; H04M 1/72403
  See application file for complete search history.

(56) References Cited

U.S. PATENT DOCUMENTS

2015/0382264 A1 12/2015 Cho et al.
2016/0294610 A1* 10/2016 Yang ...................... H04L 43/16
(Continued)

FOREIGN PATENT DOCUMENTS

CN 106102098 A 11/2016
CN 106358294 A 1/2017
(Continued)

OTHER PUBLICATIONS

"IEEE Recommended Practice for Network Reference Model and Functional Description of IEEE 802(R) Access Network," in IEEE Std 802.1CF-2019 , vol. No., pp. 1-185, May 31, 2019, doi: 10.1109/IEEESTD.2019.8726453. (Year: 2019).*
(Continued)

*Primary Examiner* — William D Cumming
(74) *Attorney, Agent, or Firm* — BROOKS KUSHMAN P.C.

(57) ABSTRACT

A multi-network access method and a terminal device are provided. The method includes: receiving a first input for a network acceleration identifier by a user, where the network acceleration identifier is an entrance for triggering the terminal device to access a network; and displaying a target interface in response to the first input, where the target interface includes at least one of a first control or a second control, where the first control is configured to trigger the terminal device to access M second wireless local area networks in a case that that a first wireless local area network is accessed, and the second control is configured to trigger the terminal device to access N mobile data networks in a case that the first wireless local area network is accessed; A data transmission speed based on a plurality of accessed networks is greater than that based on the first wireless local area network.

20 Claims, 12 Drawing Sheets

(56) References Cited

U.S. PATENT DOCUMENTS

| | | | |
|---|---|---|---|
| 2017/0265070 A1 | 9/2017 | Patel et al. | |
| 2019/0098566 A1 | 3/2019 | Li et al. | |
| 2022/0217799 A1* | 7/2022 | Zhu | H04W 76/15 |
| 2023/0046894 A1* | 2/2023 | Liu | H04L 63/0272 |
| 2024/0061802 A1* | 2/2024 | Li | G06F 13/28 |
| 2024/0264850 A1* | 8/2024 | Liu | G06F 9/451 |

FOREIGN PATENT DOCUMENTS

| | | | | |
|---|---|---|---|---|
| CN | 106376099 A | | 2/2017 | |
| CN | 107295574 A | | 10/2017 | |
| CN | 107635248 A | | 1/2018 | |
| CN | 110224863 A | | 9/2019 | |
| CN | 110233937 A | | 9/2019 | |
| CN | 110769524 A | * | 2/2020 | H04M 1/72403 |
| EP | 4017209 A1 | * | 6/2022 | H04M 1/72403 |
| EP | 4017209 A4 | * | 10/2022 | H04M 1/72403 |
| JP | 2016513431 A | | 5/2016 | |
| WO | WO-2021057545 A1 | * | 4/2021 | H04M 1/72403 |

OTHER PUBLICATIONS

First Office Action for Japanese Application No. 2022-517250, dated Feb. 8, 2023, 2 Pages.

First Office Action for Chinese Application No. 201910918667.2, dated Dec. 25, 2020, 7 Pages.

International Search Report and Written Opinion for Application No. PCT/CN2020/115285, dated Dec. 4, 2020, 9 Pages.

1st Chinese Office Action, English Translation.

International Search Report and Written English Translation Opinion, English Translation.

Extended European Search Report for Application No. 20869148.5-1216, dated Sep. 7, 2022, 12 Pages.

Jeet, "Vivo's Dual Wi-Fi Acceleration Technology Can Connect Two Networks at Once," GizmoChina, Online Publication Date Jul. 18, 2019, URL: https://www.gizmochina.com/2019/07/18/vivo-dual-wifi-acceleration-technology/, Accessed Aug. 30, 2022, 3 pages.

Sparrow News, "iQoo Dual Wi-Fi Connection," XP No. 55955974, Video Format, Online Publication Date Jul. 18, 2019, URL: https://www.youtube.com/watch?v=1AUCpuwXZTw, Accessed Aug. 30, 2022, 2 pages.

Second Office Action for European Application No. 20869148.5, dated Jun. 13, 2024, 9 Pages.

htttps://www.gsmarena.com "Comments—Oppo and vivo announce Dual Wi-Fi for their flagships—comments" https://www.gsmarena.com/oppo vivo dual wifi-news-3820, Jul. 2019, 5 Pages.

https://www.gsmarena.com "Oppo and vivo announce Dual Wi-Fi for their flagships—GSMArena.com news" https://www.gsmarena.com/oppo vivo dual wifi-news-3820, Jul. 2019, 3 Pages.

* cited by examiner (a)

(b)

(a)

(b)

(c)

//www.w3.org/1999/xhtml">
MULTI-NETWORK ACCESS METHOD AND TERMINAL DEVICE

CROSS-REFERENCE TO RELATED APPLICATIONS

This application is a bypass continuation application of International Application No. PCT/CN2020/115285 filed on Sep. 15, 2020, which claims priority to Chinese Patent Application No. 201910918667.2, filed on Sep. 26, 2019, which are incorporated herein by reference in their entireties.

TECHNICAL FIELD

Embodiments of the present disclosure relate to the field of communications technologies, and in particular, to a multi-network access method and a terminal device.

BACKGROUND

With the continuous development of terminal technologies, terminal devices are more widely applied. Smooth network experience is very important to terminal devices. In particular, a stable large-traffic network environment is required in scenes such as games, videos, and live broadcasts. In view of this, a wireless local area network (Wireless Local Area Networks, WLAN) scheme has been made to improve user experience greatly.

However, the current WLAN scheme may still not be able to meet user demands. Therefore, how to improve a data transmission speed during interaction between a terminal device and a network has become a problem that terminal manufacturers need to solve urgently.

SUMMARY

Embodiments of the present disclosure provide a multi-network access method and a terminal device.

According to a first aspect, an embodiment of the present disclosure provides a multi-network access method applied to a terminal device. The method includes: receiving a first input for a network acceleration identifier by a user, where the network acceleration identifier is an entrance for triggering the terminal device to access a network; and displaying a target interface in response to the first input, where the target interface includes at least one of a first control or a second control, where the first control is configured to trigger the terminal device to access M second wireless local area networks in a case that a first wireless local area network is accessed, and the second control is configured to trigger the terminal device to access N mobile data networks in a case that the first wireless local area network is accessed. A data transmission speed based on a plurality of accessed networks is greater than that based on the first wireless local area network, and M and N are both positive integers.

According to a second aspect, an embodiment of the present disclosure provides a terminal device. The terminal device includes a receiving module and a display module. The receiving module is configured to receive a first input for a network acceleration identifier by a user. The network acceleration identifier is an entrance for triggering the terminal device to access a network. The display module is configured to display a target interface in response to the first input received by the receiving module. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. The data transmission speed based on a plurality of accessed networks is greater than that based on the first wireless local area network and M and N are both positive integers.

According to a third aspect, an embodiment of the present disclosure provides a terminal device. The terminal device includes a processor, a memory, and a computer program that is stored in the memory and that runs on the processor, and when the processor executes the computer program, the steps of the multi-network access method according to the first aspect are implemented.

According to a fourth aspect, an embodiment of the present disclosure provides a non-transitory computer-readable storage medium. The non-transitory computer-readable storage medium stores a computer program, and when a processor executes the computer program, the steps of multi-network access method according to the first aspect are implemented.

DETAILED DESCRIPTION

Figure 1:
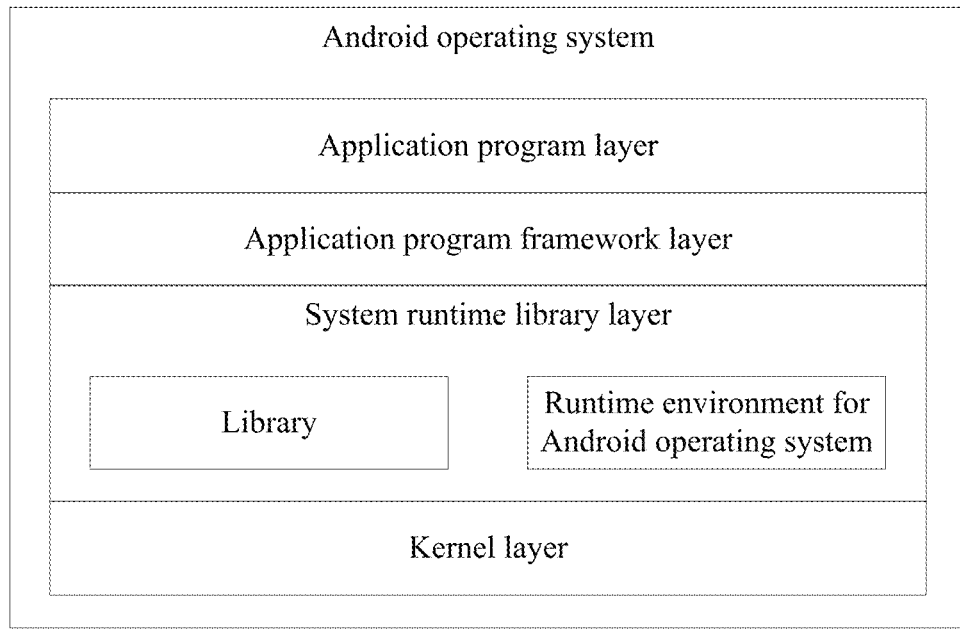
FIG. 1 is a schematic structural diagram of a possible Android™ operating system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of this application.

The term "and/or" in this specification describes an association relationship of associated objects, indicating that three relationships may exist. For example, A and/or B may indicate three cases: Only A exists, both A and B exist, and only B exists. A character "I" in this specification indicates an "or" relationship between associated objects. For example, AB indicates AorB.

In the specification and claims of the present disclosure, the terms such as "first" and "second" are used to distinguish between different objects, but are not used to describe a particular sequence of the objects. For example, the first input and the second input are used to distinguish between different inputs, instead of describing a specific order of inputs.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise stated, "a plurality of" means two or more. For example, a plurality of processing units means two or more processing units; a plurality of elements means two or more elements, and the like.

Embodiments of the present disclosure provide a multi-network access method and a terminal device. The terminal device may receive a first input for a network acceleration identifier by a user. The network acceleration identifier is an entrance for triggering the terminal device to access a network. A target interface is displayed in response to the first input. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on a plurality of accessed networks is greater than that based on the first wireless local area network and M and N are both positive integers. The embodiments of the present disclosure are expanded and supported in the current existing WLAN settings. An entrance identifier for triggering multi-network acceleration is added, so that the user may input the entrance identifier to trigger the terminal device to access a plurality of networks. In this solution, in a case that the terminal device accesses a primary WLAN, if the user triggers the terminal device to perform multi-network acceleration, the terminal device that accesses the primary WLAN may access M auxiliary WLAN and/or N mobile data networks, so that the terminal device may transmit data through the plurality of accessed networks, realizing multi-network acceleration. In this way, through the embodiments of the present disclosure, a data transmission speed during interaction between the terminal device and a network can be increased.

The terminal device in the embodiments of the present disclosure may be a terminal device with an operating system. The operating system may be an Android™ (Android™) operating system, an iOS operating system, or other possible operating systems, which is not specifically limited in the embodiments of the present disclosure.

The following takes the Android™ operating system as an example to describe a software environment to which the multi-network access method provided in the embodiments of the present disclosure is applied.

FIG. 1 is a schematic architectural diagram of a possible Android™ operating system according to an embodiment of the present disclosure. In FIG. 1, an architecture of the Android™ operating system includes four layers: an application program layer, an application program framework layer, a system runtime library layer, and a kernel layer (which may be specifically a-Linux Linux® kernel layer).

The application program layer includes various application programs (including a system application program and a third-party application program) in the Android™ operating system.

The application program framework layer is an application program framework, and a developer may develop some application programs based on the application program framework layer following a rule of developing the application program framework.

The system runtime library layer includes a library (also referred to as a system library) and a runtime environment of the Android™ operating system. The library mainly provides various resources required for the Android™ operating system. The runtime environment of the Android™ operating system is used to provide the Android™ operating system with a software environment.

The kernel layer is an operating system layer of the Android™ operating system, and is the lowest layer of software levels of the Android™ operating system. The kernel layer provides the Android™ operating system with a core system service and a hardware-related driver based on the Linux® kernel.

The Android™ operating system is used as an example. In the embodiments of the present invention, a developer may develop, based on the system architecture of the Android™ operating system shown in FIG. 1, a software program to implement the multi-network access method provided in the embodiments of the present invention, so that the multi-network access method can be performed based on the Android™ operating system shown in FIG. 1. That is, a processor or the terminal device may run the software program in the Android Android™ operating system to implement the multi-network access method provided in the embodiments of the present disclosure.

The terminal device in the embodiments of the present disclosure may be a mobile terminal, or a non-mobile terminal. Exemplarily, the mobile terminal may be a mobile phone, a tablet computer, a laptop computer, a palmtop computer, an in-vehicle terminal, a wearable device, an ultra-mobile personal computer (ultra-mobile personal computer, UMPC), a netbook, or a personal digital assistant (personal digital assistant, PDA). The non-mobile terminal may be a personal computer (personal computer, PC), a television (television, TV), an automated teller machine or a self-service machine. This is not specifically limited in the embodiments of the present disclosure.

The multi-network access method provided in the embodiments of the present disclosure may be performed by the foregoing terminal device, or a functional module and/or a functional entity that can implement the multi-network access network in the terminal device. Specifically, this may be determined based on an actual use requirement, and is not limited in the embodiments of the present disclosure. The terminal device is used as an example below to describe the multi-network access method provided in the embodiments of the present disclosure.

The following describes the multi-network access method provided in the embodiments of the present disclosure by using an example with reference to the accompanying drawings.

Figure 2:
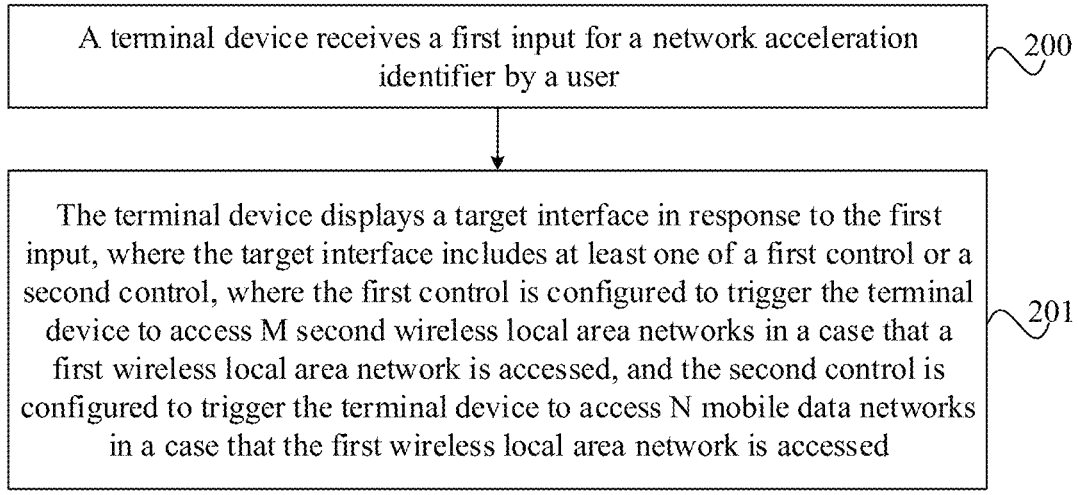
FIG. 2 is a first schematic diagram of a multi-network access method according to an embodiment of the present disclosure.

As shown in FIG. 2, an embodiment of the present disclosure provides a multi-network access method. The multi-network access method may include the following step 200 and step 201.

Step 200: A terminal device receives a first input for a network acceleration identifier by a user.

The network acceleration identifier may be an entrance for triggering the terminal device to access a network.

In this embodiment of the present disclosure, if the user needs to increase a network transmission speed (also referred to as the network speed) during use the terminal device, the user may perform a first input for the network acceleration identifier displayed in the terminal device to trigger the terminal device to display an interface (that is, the target interface described below) for setting multi-network access. In this way, access to a plurality of networks through the terminal device can help increase the network speed, that is, implement multi-network acceleration.

Optionally, in this embodiment of the present disclosure, the network acceleration identifier may be displayed in the form of icon, in the form of text (for example, "smart multi-network acceleration"), in the form of a combination of icon and text, or in any other form to be used to indicate that the network speed will be increased by accessing a plurality of networks. Specifically, the form may be determined according to actual use requirements, and is not limited in this embodiment of the present disclosure.

Optionally, in this embodiment of the present disclosure, the first input may be a click input (for example, single-click input or double-click input) for the network acceleration identifier by the user, a sliding input for the network acceleration identifier by the user, or any other input that meets actual use requirements. Specifically, the input form may be determined according to actual use requirements, and is not limited in this embodiment of the present disclosure.

Step 201: The terminal device displays a target interface in response to the first input, where the target interface includes at least one of a first control or a second control, where the first control is configured to trigger the terminal device to access M second wireless local area networks in a case that a first wireless local area network is accessed, and the second control is configured to trigger the terminal device to access N mobile data networks in a case that the first wireless local area network is accessed.

The data transmission speed based on a plurality of accessed networks is greater than that based on the first wireless local area network and M and N are positive integers.

In this embodiment of the present disclosure, the target interface may include a first control or a second control, or include the first control and the second control. Specifically, this may be determined based on actual use requirements, and is not limited in this embodiment of the present disclosure.

In this embodiment of the present disclosure, after the user performs the first input for the network acceleration identifier, the terminal device may display the target interface, and may further perform an input for the first control and/or the second control in the target interface to trigger the terminal device to access a plurality of networks.

For example, the terminal device accesses both the first wireless local area network and M second wireless local area networks. Alternatively, the terminal device accesses both the first wireless local area network and N mobile data networks. Alternatively, the terminal device accesses the first wireless local area network, the M second wireless local area networks, and the N mobile data networks.

It should be noted that, for ease of description, for example, the terminal device accesses the first wireless local area network and one second wireless local area network (hereinafter referred to as dual band WLAN acceleration), accesses the first wireless local area network and a mobile data network (hereinafter referred to as data network acceleration), or accesses the first wireless local area network, one second wireless local area network, and one mobile data network (that is, a combination of the dual band WLAN acceleration and the data network acceleration) below, to illustrate possible implementations of multi-network acceleration.

In this embodiment of the present disclosure, the first wireless local area network may be a wireless local area network that the user manually selects to access, or a wireless local area network that the terminal device automatically accesses, which may be determined according to actual use requirements and is not limited in this embodiment of the present disclosure.

For ease of description, the first wireless local area network may be referred to as a primary WLAN, and the second wireless local area networks may be referred to as auxiliary WLANs. For example, in a case that the terminal device accesses the primary WLAN, if the user needs network acceleration, the user may trigger the terminal device to access an auxiliary WLAN, so that the terminal device that accesses the primary WLAN may access the auxiliary WLAN to implement network acceleration.

Optionally, in this embodiment of the present disclosure, in addition to that a wireless local area network accessed first is the primary WLAN, and a wireless local area network accessed later is an auxiliary WLAN, the primary WLAN and auxiliary WLAN may be further specified according to a network speed of the accessed wireless local area network in this embodiment of the present disclosure. For example, a wireless local area network with the highest network speed among a plurality of accessed wireless local area networks may be referred to as the primary WLAN, and wireless local area networks other than the primary WLAN among the plurality of accessed wireless local area networks may be referred to as auxiliary WLANs.

Figure 3:
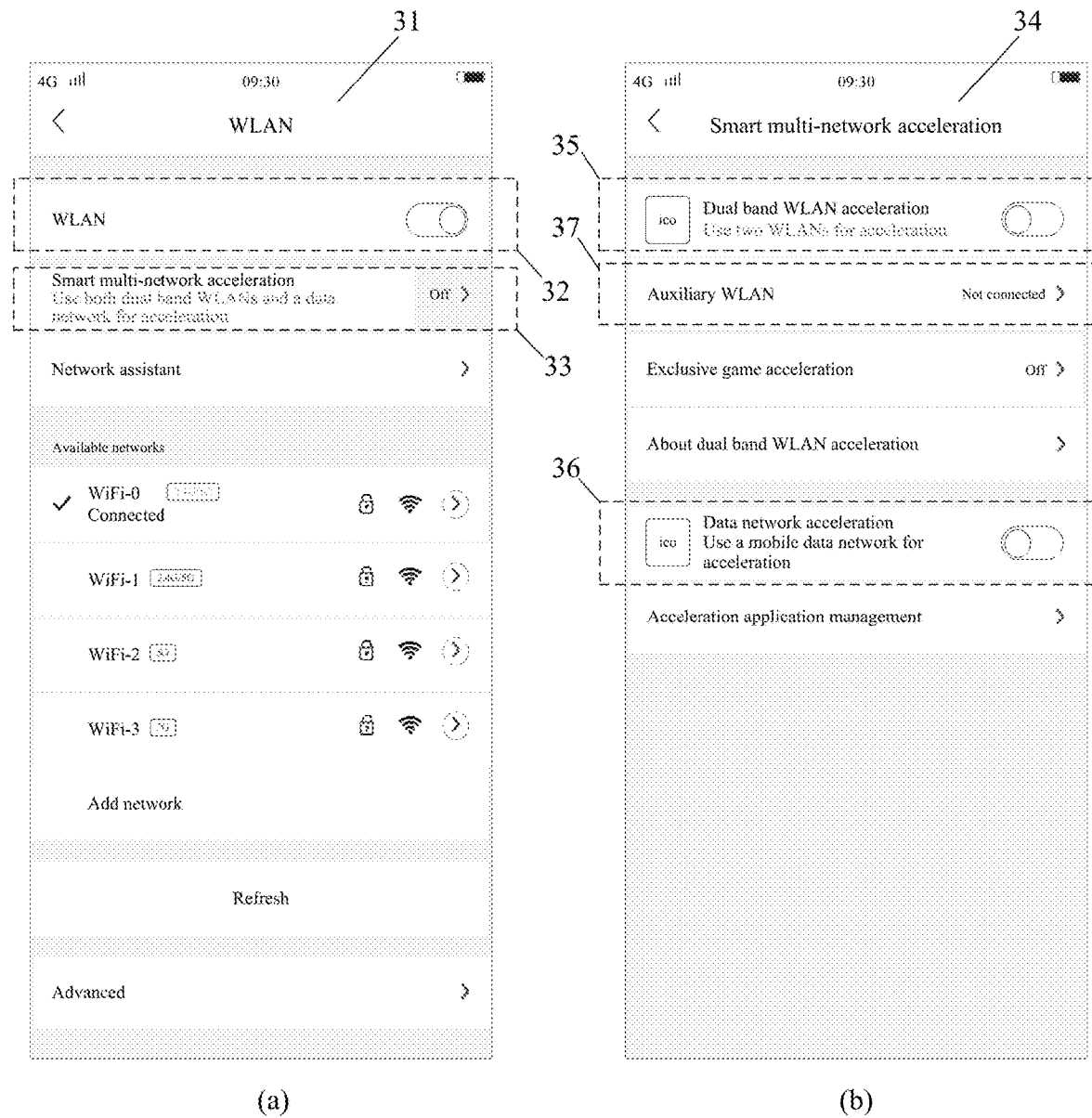
FIG. 3 is a first schematic diagram of an interface to which a multi-network access method is applied, according to an embodiment of the present disclosure.
Figure 4:
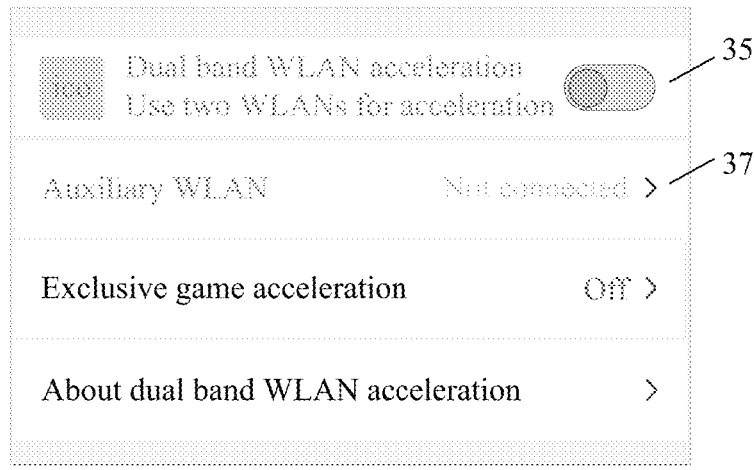
FIG. 4 is a second schematic diagram of an interface to which a multi-network access method is applied, according to an embodiment of the present disclosure.

With reference to FIG. 3 and FIG. 4, setting interfaces of multi-network access in embodiments of the present disclosure are exemplarily described below.

As shown in (a) of FIG. 3, a "WLAN" control 32 (configured to trigger setting of a primary WLAN) and a "Smart multi-network acceleration" identifier 33 (that is, the foregoing network acceleration identifier) are displayed on a setting interface 31. If a user clicks the "Smart multi-network acceleration" identifier 33, a terminal device display interface 34 (that is, the foregoing target interface) is shown in (b) of FIG. 3. The interface 34 includes a "Dual band WLAN acceleration" control 35 (that is, the foregoing first control, configured to trigger setting of dual band WLAN acceleration) and a "Data network acceleration" control 36 (that is, the foregoing second control, configured to trigger setting of data network acceleration).

Optionally, a corresponding application acceleration whitelist may be configured for the dual band WLAN acceleration or data network acceleration, respectively. The dual band WLAN acceleration is used as an example. In a case that the terminal device accesses a primary WLAN, if a network speed of the primary WLAN is slow and the user triggers the dual band WLAN acceleration, both the primary WLAN and an auxiliary WLAN may be used for an application enabled through a switch of the application acceleration whitelist to ensure smooth network experience.

As shown in (b) of FIG. 3, The "Dual band WLAN acceleration" control 35 may be turned off by default (that is, the dual band WLAN acceleration is disabled). Optionally, when the "Dual band WLAN acceleration" control 35 is turned off, an "Auxiliary WLAN" control 37 (configured to trigger setting of an auxiliary WLAN) may be grayed and prohibit user operations. If the user triggers enabling of the "Dual band WLAN acceleration", the terminal device may control the "Auxiliary WLAN" control 37 to be changed from gray to black, indicating that the auxiliary WLAN is changed from inoperable to operable.

Optionally, as shown in FIG. 4, when the primary WLAN is not successfully connected, the "Dual band WLAN acceleration" control 35 and the "Auxiliary WLAN" entrance 37 may both be grayed to prohibit user operations.

With reference to FIG. 3 and FIG. 4, the embodiments of the present disclosure are expanded in existing WLAN settings to support scanning list display, connection, and disconnection of the auxiliary WLAN. A plurality of WLANs, as a means to improve network smoothness and stability, is integrated with the existing data network acceleration to be unified into one entrance (that is, an entrance indicated by the "Smart multi-network acceleration" identifier 33 as shown in (a) of FIG. 3). In this solution, in a case that the terminal device accesses the primary WLAN, if the user triggers the terminal device to perform multi-network acceleration, the terminal device that accesses the primary WLAN may access M auxiliary WLAN and/or N mobile data networks, so that the terminal device may transmit data through the plurality of accessed networks, realizing multi-network acceleration. In this way, a data transmission speed during interaction between the terminal device and networks can be increased.

In a multi-network access method provided according to the embodiments of the present disclosure, a first input for a network acceleration identifier by a user may be received. The network acceleration identifier is an entrance for triggering the terminal device to access a network. A target interface is displayed in response to the first input. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on a plurality of accessed networks is greater than that based on the first wireless local area network, and M and N are both positive integers. The embodiments of the present disclosure are expanded and supported in current WLAN settings. Specifically, an entrance identifier for triggering multi-network acceleration is added, so that the user may input the entrance identifier to trigger the terminal device to access a plurality of networks. In this solution, in a case that the terminal device accesses a primary WLAN, if the user triggers the terminal device to perform multi-network acceleration, the terminal device that accesses the primary WLAN may access M auxiliary WLANs and/or N mobile data networks, so that the terminal device may transmit data through a plurality of accessed networks, realizing multi-network acceleration. In this way, through the embodiments of the present disclosure, a data transmission speed during interaction between the terminal device and a network can be increased.

The following first, second, and third implementations are used to illustrate dual band WLAN acceleration (that is, the primary WLAN+M auxiliary WLANs), mobile data network acceleration (that is, the primary WLAN+N mobile data networks), and combined acceleration of dual band WLANs and a mobile data network, respectively.

First implementation: multi-WLAN acceleration

In the first implementation, the terminal device may access M auxiliary WLANs in a case that a primary WLAN is accessed, so that the terminal device may access a plurality of networks (that is, the primary WLAN+M auxiliary WLANs) to implement multi-WLAN acceleration.

In an embodiment of the present disclosure, the terminal device may access auxiliary WLANs in an automatic access mode or a manual access mode.

Automatic access mode: after the primary WLAN is successfully connected, the terminal device may automatically determine a network with the best quality from available auxiliary WLANs according to a traditional scoring mechanism, and then access the determined network.

Manual access mode: the user is allowed to manually select a network to connect to from the available auxiliary WLANs.

Specific implementations of automatic access and manual access are described through the following modes 1 and 2.

Mode 1: Automatic Access

Optionally, in this embodiment of the present disclosure, it is assumed that the foregoing target interface includes a first control, and the user may perform an input for the first control to trigger a terminal device to automatically access M second wireless local area networks in a case that a first wireless local area network is accessed.

Figure 5:
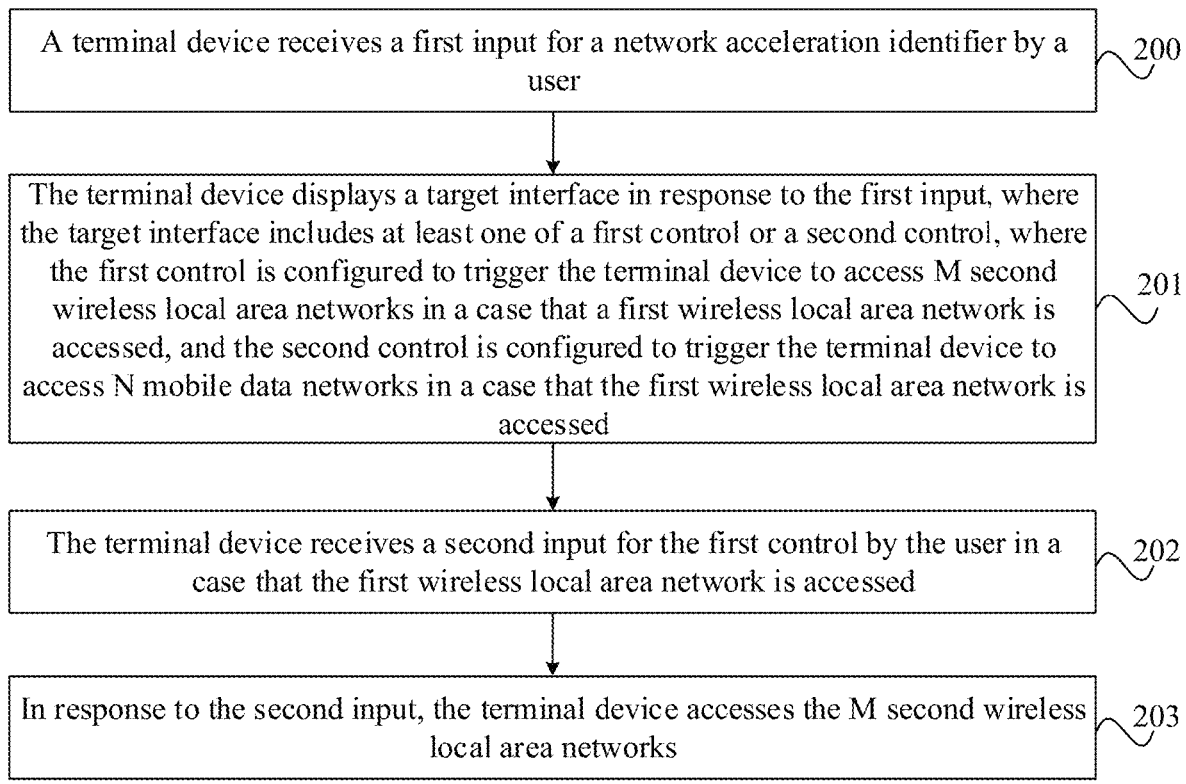
FIG. 5 is a second schematic diagram of a multi-network access method according to an embodiment of the present disclosure.

Exemplarily, with reference to FIG. 2, as shown in FIG. 5, after the foregoing step 201, the multi-network access method provided according to an embodiment of the present disclosure may further include the following step 202 and step 203.

Step 202: The terminal receives a second input for the first control by the user in a case that the first wireless local area network device is accessed.

In this embodiment of the present disclosure, the second input may be a click input (for example, single-click input or double-click input) on the first control by the user, a sliding input for the first control by the user, or any other possible input, which may be determined according to actual use requirements and is not limited in this embodiment of the present disclosure.

Step 203: In response to the second input, the terminal device accesses the M second wireless local area networks.

The foregoing M second wireless local area networks are top M wireless local area networks among detected wireless local area networks in descending order of network signal strengths.

In this solution, in a case that the terminal device accesses the first wireless local area network, if the user performs an input for the first control, the terminal device may automatically access the M second wireless local area networks.

Mode 2: Manual Access

Optionally, in this embodiment of the present disclosure, when the foregoing target interface includes a first control, the user may further manually select M wireless local area networks from detected wireless local area networks after performing an input for the first control to trigger a terminal device to access the M wireless local area networks.

Figure 6:
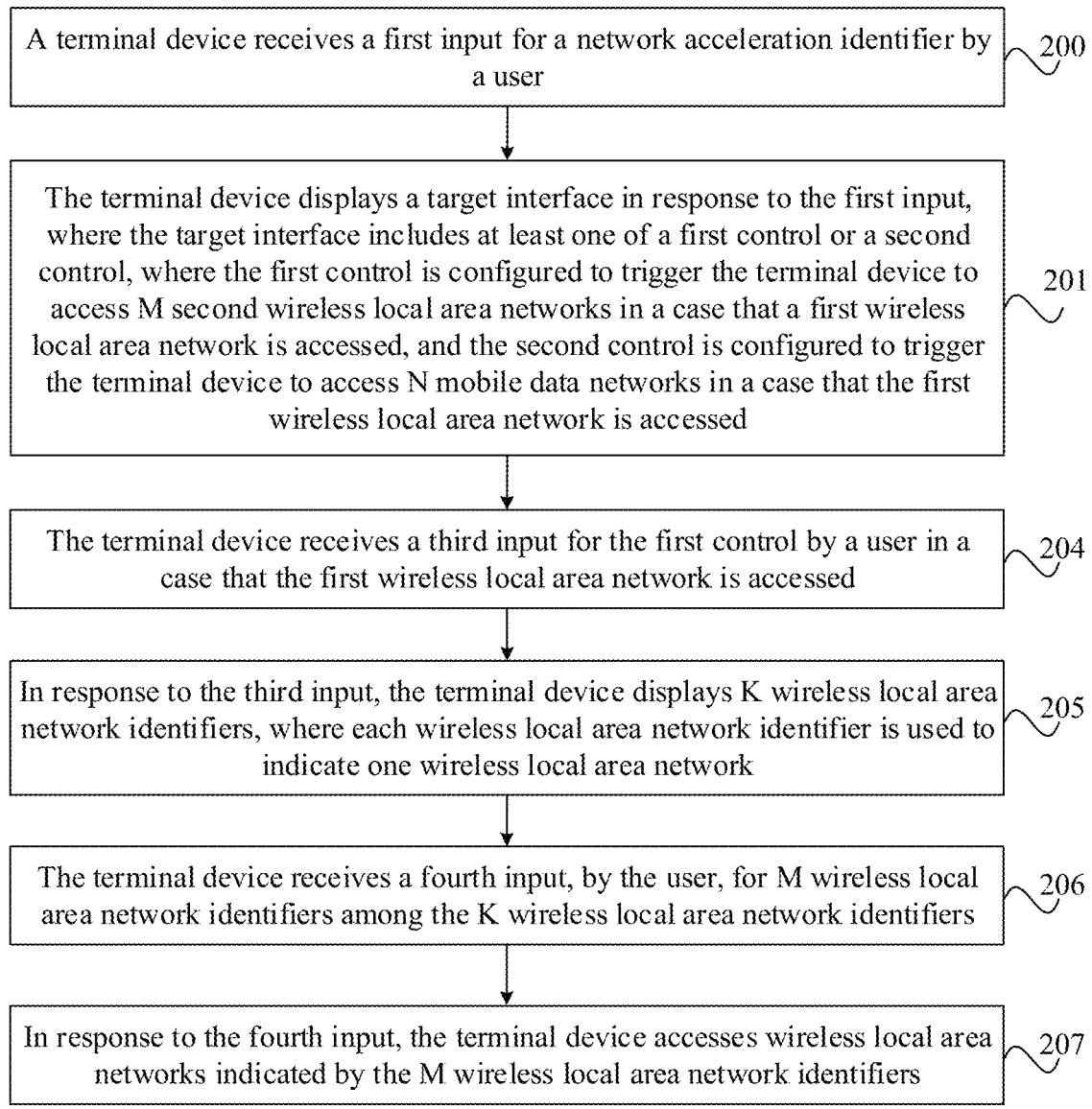
FIG. 6 is a third schematic diagram of a multi-network access method according to an embodiment of the present disclosure.

Exemplarily, with reference to FIG. 2, as shown in FIG. 6, after the foregoing step 201, the multi-network access method provided according to an embodiment of the present disclosure may further include the following step 204 to step 207.

Step 204: The terminal device receives a third input for the first control by the user in a case that the first wireless local area network is accessed.

In an embodiment of the present disclosure, the third input may be a click input (for example, single-click input or double-click input) on the first control by the user, a sliding input for the first control by the user, or any other possible input, which may be determined according to actual use requirements and is not limited in this embodiment of the present disclosure. The third input may be different from the second input.

Step 205: In response to the third input, the terminal device displays K wireless local area network identifiers, where each wireless local area network identifier is used to indicate one wireless local area network.

Step 206: The terminal device receives a fourth input, by the user, for M wireless local area network identifiers among the K wireless local area network identifiers.

Step 207: In response to the fourth input, the terminal device accesses wireless local area networks indicated by the M wireless local area network identifiers.

K is a positive integer greater than or equal to M.

It can be understood that the M second wireless local area networks in step 201 may be M wireless local area networks respectively indicated by the M wireless local area network identifiers in step 207.

Figure 7:
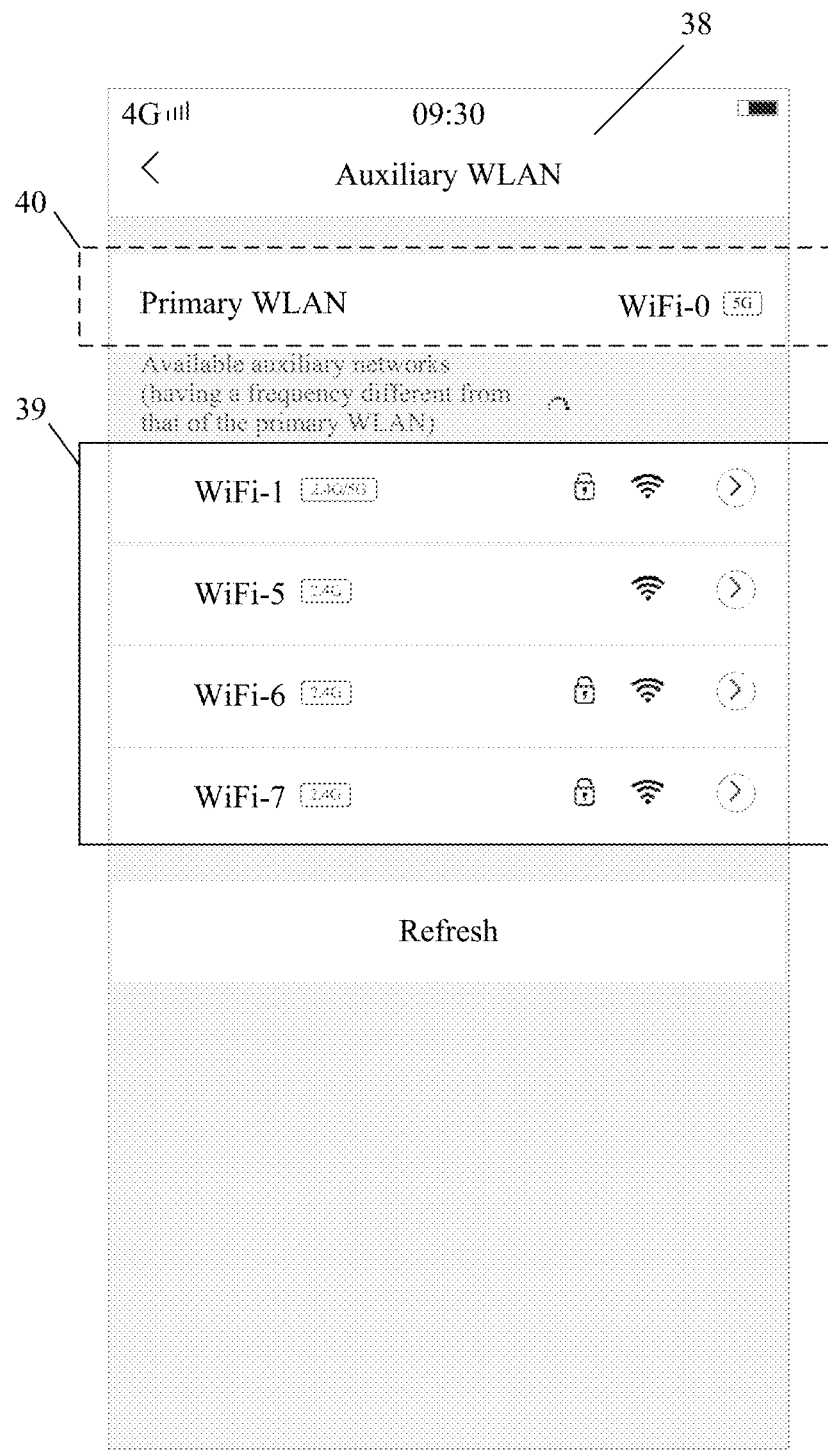
FIG. 7 is a third schematic diagram of an interface to which a multi-network access method is applied, according to an embodiment of the present disclosure.

In this embodiment of the present disclosure, since an auxiliary WLAN is used to supplement and enhance a primary WLAN, it is assumed that only when the primary WLAN is successfully connected, an identifier (for example, displayed in the form of a list) of an available network detected by the terminal device will be displayed in an expanded interface of the auxiliary WLAN. FIG. 7 shows a schematic diagram of an expanded interface of auxiliary WLANs when any of the auxiliary WLANs is connected successfully.

As shown in FIG. 7, when a primary WLAN is successfully connected and dual band WLAN acceleration is enabled, a network list 39 showing available auxiliary WLANs may be displayed in an expanded interface 38 of the auxiliary WLANs.

To reflect an effect of the dual band WLAN acceleration to a greater extent, the primary WLAN and auxiliary WLANs may be set to be connected in different frequency bands. As shown in FIG. 7, available networks in frequency bands different from that for the primary WLAN are displayed in the network list 39 of the available auxiliary WLANs.

Optionally, network information of the primary WLAN 40 may be further displayed in the expanded interface 38 of the auxiliary WLANs. When the primary WLAN is successfully connected, a service set identifier (Service Set Identifier, SSID) of the primary WLAN and a frequency band of the primary WLAN may be displayed in the expanded interface 38 of the auxiliary WLANs. As shown in FIG. 7, the network information of the primary WLAN 40 is "Primary WLAN network: WiFi-0; 5G".

As shown in FIG. 7, when an auxiliary WLAN (for example, WiFi-1; 2.4G) is successfully connected, an icon √ and/or a text "connected" is displayed to indicate that the auxiliary WLAN is successfully connected.

SSIDs and encryption methods of 2.4G and 5G access points (Access Point, AP) of a dual band router are the same. In this case, when the auxiliary WLAN is connected in one of the frequency bands, an identifier of the other frequency band needs to be overshadowed (for example, grayed). For example, with reference to FIG. 7, the terminal device accesses a dual band AP WiFi-1. If the terminal device accesses a 2.4G network, a 5G identifier will be overshadowed.

Figure 8:
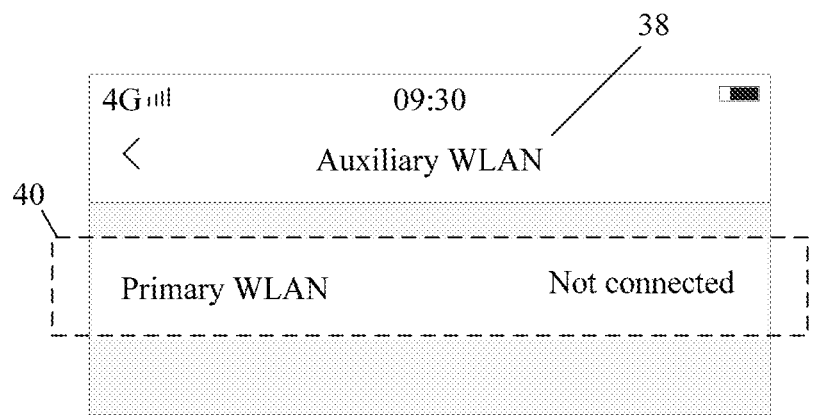
FIG. 8 is a fourth schematic diagram of an interface to which a multi-network access method is applied, according to an embodiment of the present disclosure.

In addition, as shown in FIG. 8, when a primary WLAN is not successfully connected, a terminal device may display network information of a primary WLAN 40 in an expanded interface 38 of auxiliary WLANs: "Primary WLAN: not connected".

Figure 9:
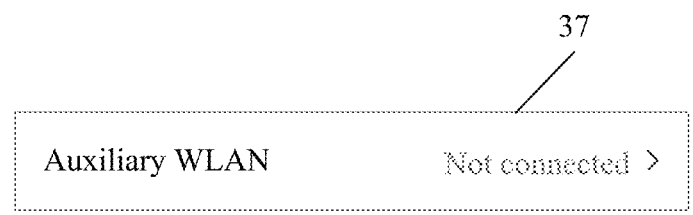
FIG. 9 is a fifth schematic diagram of an interface to which a multi-network access method is applied, according to an embodiment of the present disclosure.
Figure 9:
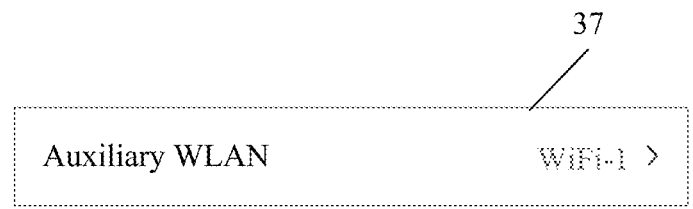

With reference to (b) of FIG. 3, as shown in FIG. 9, when a primary WLAN is successfully connected and dual band WLAN acceleration is enabled, a connection status of an auxiliary WLAN may be displayed on an "Auxiliary WLAN" control 37 (such as an entrance on the right) in (b) of FIG. 3. As shown in (a) of FIG. 9, when an auxiliary WLAN is not connected, a "not connected" status is displayed on the "Auxiliary WLAN" control 37. As shown in (b) of FIG. 9, when the auxiliary WLAN is successfully connected, an SSID (for example, WiFi-1) of a connected auxiliary WLAN is displayed on the "Auxiliary WLAN" control 37.

In an embodiment of the present disclosure, a terminal device may automatically access or manually select and access M auxiliary WLANs in a case that a primary WLAN is accessed, so that the terminal device may access a plurality of networks (that is, the primary WLAN+M auxiliary WLANs) to implement multi-WLAN acceleration. In this way, a data transmission speed during interaction between the terminal device and networks can be increased.

Second Implementation: Data Network Acceleration

In the second implementation, a terminal device may access N mobile data networks in a case that a primary WLAN is accessed, so that the terminal device may access a plurality of networks (that is, the primary WLAN+N mobile data networks) to implement multi-network acceleration.

Optionally, in an embodiment of the present disclosure, it is assumed that the foregoing target interface includes a second control, and the user may perform an input for a second control to trigger the terminal device to access N mobile data networks in a case that a first wireless local area network is accessed.

Figure 10:
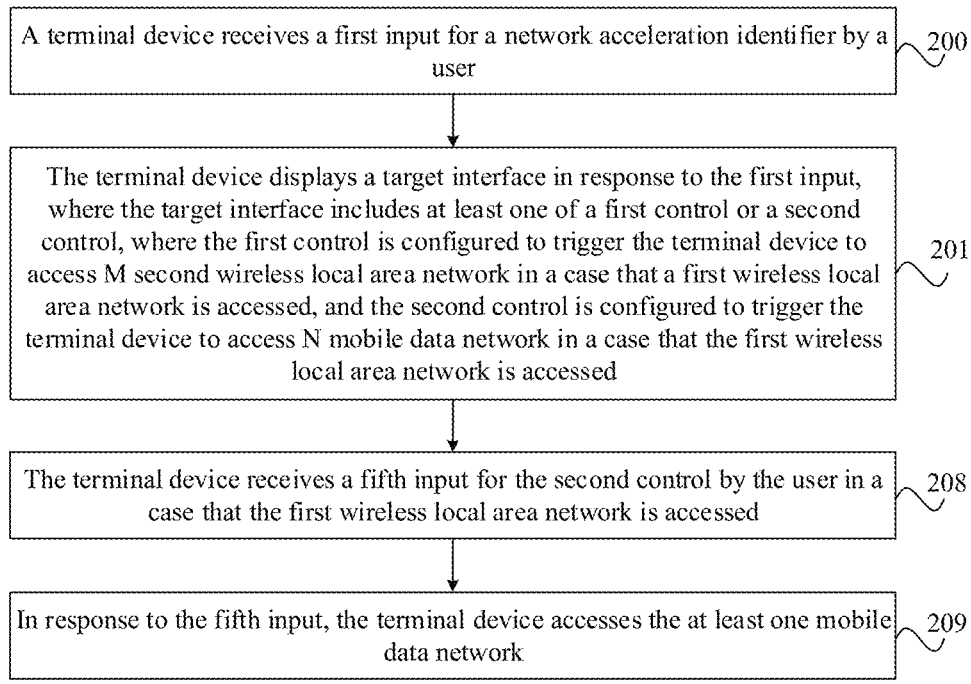
FIG. 10 is a fourth schematic diagram of a multi-network access method according to an embodiment of the present disclosure.

Exemplarily, with reference to FIG. 2, as shown in FIG. 10, after the foregoing step 201, the multi-network access method provided according to an embodiment of the present disclosure may further include the following step 208 and step 209.

Step 208: The terminal device receives a fifth input for the second control by the user in a case that the first wireless local area network is accessed.

In this embodiment of the present disclosure, the fifth input may be a click input (for example, single-click input or double-click input) on the second control by the user, a sliding input for the second control by the user, or any other possible input, which may be determined according to actual use requirements and is not limited in this embodiment of the present disclosure.

Step 209: In response to the fifth input, the terminal device accesses N mobile data networks.

In this embodiment of the present disclosure, in a case that the terminal device accesses a primary WLAN, if the primary WLAN has a poor network speed and the user triggers data network acceleration, both the primary WLAN and mobile data networks may be used for an application enabled through a switch of an application acceleration whitelist to ensure smooth network experience.

In this embodiment of the present disclosure, the terminal device that accesses the primary WLAN may select and access the N mobile data networks, so that the terminal device may access a plurality of networks (that is, the primary WLAN+N mobile data networks) to implement multi-network acceleration. In this way, a data transmission speed during interaction between the terminal device and networks can be increased.

Third Implementation: Multi-WLAN Acceleration+Mobile Data Network Acceleration

In the third implementation, a terminal device that accesses a primary WLAN may access M auxiliary WLANs and N mobile data networks, so that the terminal device may access a plurality of networks (that is, the primary WLAN+M auxiliary WLANs+N mobile data networks) to implement multi-network acceleration.

Optionally, in an embodiment of the present disclosure, it is assumed that a target interface includes a first control and a second control, a user may perform an input for the first control and the second control to trigger the terminal device to access M second wireless local area networks and N mobile data networks in a case that a first wireless local area network is accessed.

Figure 11:
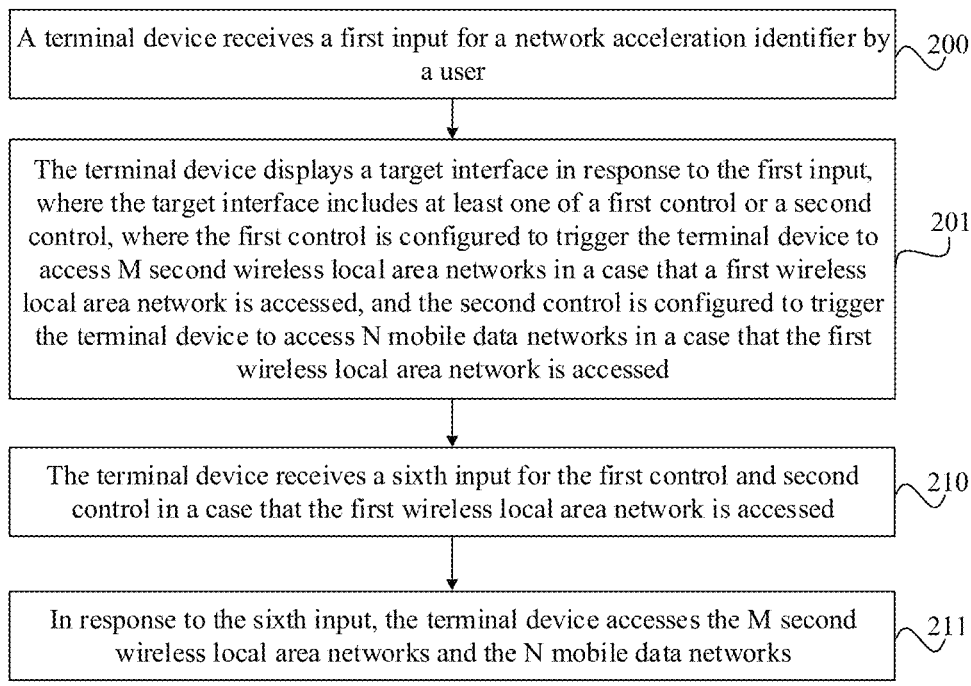
FIG. 11 is a fifth schematic diagram of a multi-network access method according to an embodiment of the present disclosure.

Exemplarily, with reference to FIG. 2, as shown in FIG. 11, after the foregoing step 201, the multi-network access method provided according to an embodiment of the present disclosure may further include the following step 210 and step 211.

Step 210: The terminal device receives a sixth input for the first control and the second control by the user in a case that the first wireless local area network is accessed.

In an embodiment of the present disclosure, the sixth input may be a click input (for example, single-click input or double-click input) on the first control and the second control by the user, a sliding input for the first control and the second control by the user, or any other possible input, which may be determined according to actual use requirements and is not limited in this embodiment of the present disclosure.

Step 211: In response to the sixth input, the terminal device accesses the M second wireless local area networks and the N mobile data networks.

In this embodiment of the present disclosure, the terminal device may select and access N mobile data networks after accessing the primary WLAN, so that the terminal device may access a plurality of networks (that is, the primary WLAN+M WLANs+N mobile data networks) to implement multi-network acceleration. In this way, a data transmission speed during interaction between the terminal device and networks can be increased.

Optionally, in this embodiment of the present disclosure, the terminal device may display acceleration status information of a current network in a network acceleration identifier according to network acceleration settings (for example, dual band WLAN acceleration, data network acceleration, or both the dual band WLAN acceleration and data network acceleration are enabled). This is illustrated below with reference to (a) of FIG. 3 and FIG. 12.

As shown in (a) of FIG. 12, if neither dual band WLAN acceleration or data network acceleration is enabled, status information "Off" is displayed on a "Smart multi-network acceleration" identifier 33 (such as an entrance on the right, the same below), indicating that multi-network acceleration is disabled.

Figure 12:
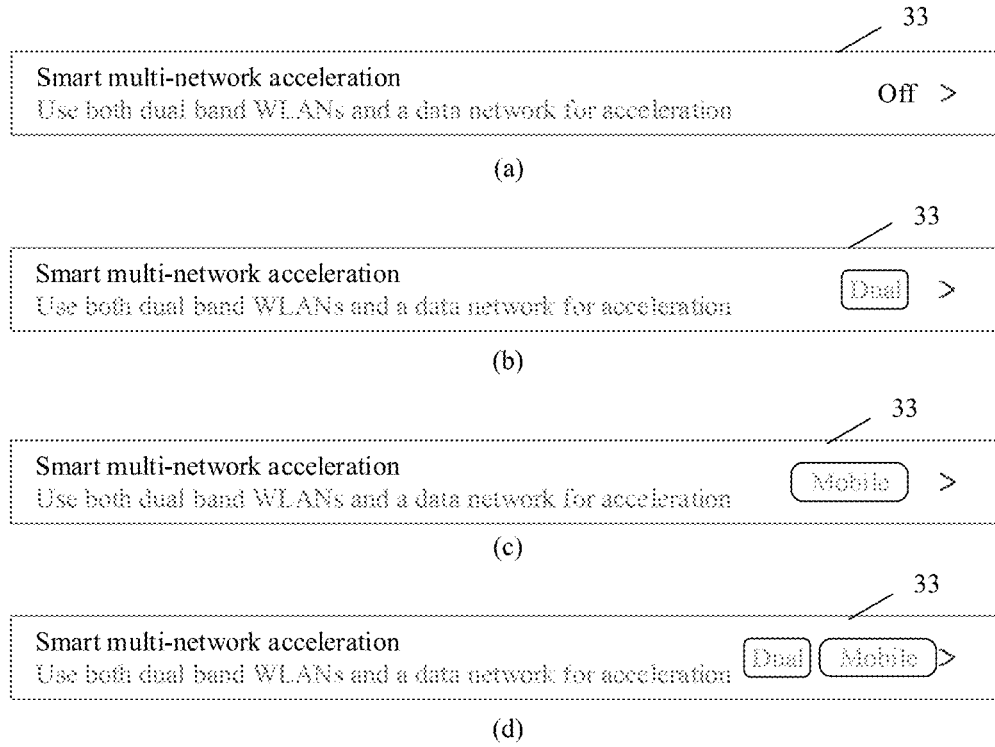
FIG. 12 is a sixth schematic diagram of an interface to which a multi-network access method is applied, according to an embodiment of the present disclosure.

As shown in (b) of FIG. 12, if the dual band WLAN acceleration is enabled and the data network acceleration is disabled, status information "Dual" is displayed on the "Smart multi-network acceleration" identifier 33, indicating that the dual band WLAN acceleration is enabled.

As shown in (c) of FIG. 12, if the dual band WLAN acceleration is disabled and the data network acceleration is enabled, status information "Mobile" is displayed on the "Smart multi-network acceleration" identifier 33, indicating that the data network acceleration is enabled.

As shown in (d) of FIG. 12, if both the dual band WLAN acceleration and the data network acceleration are enabled, status information "Dual+Mobile" is displayed on the "Smart Multi-Network Acceleration" identifier 33, indicating that both the dual band WLAN acceleration and the data network acceleration are enabled.

In this embodiment of the present disclosure, by displaying the status information of the smart multi-network acceleration, the user can intuitively see the current status of the multi-network acceleration, thereby improving human-computer interaction performance.

Figure 13:
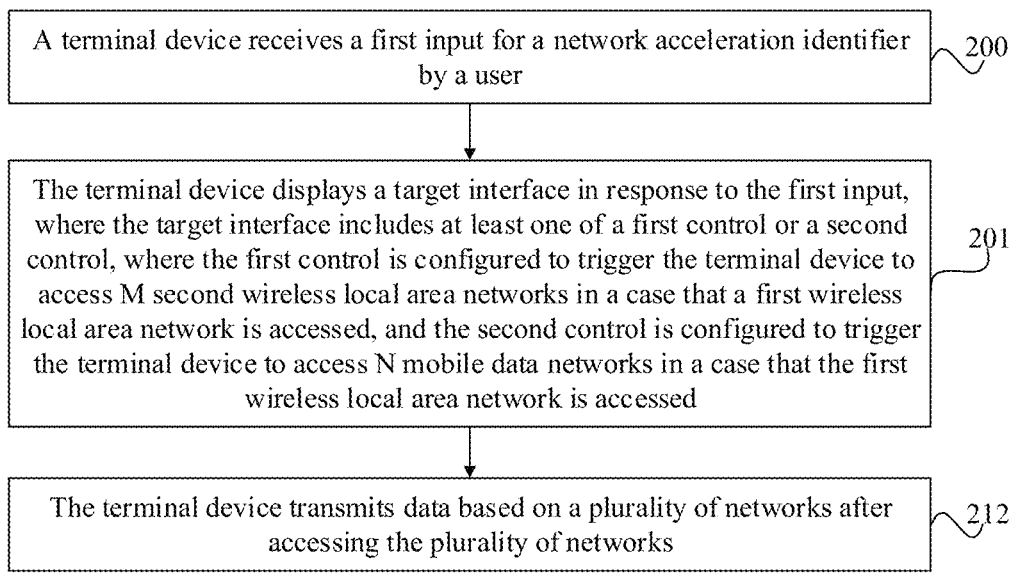
FIG. 13 is a sixth schematic diagram of a multi-network access method according to an embodiment of the present disclosure.

Optionally, with reference to FIG. 2, as shown in FIG. 13, after the foregoing step 201, the multi-network access method provided according to an embodiment of the present disclosure may further include the following step 212.

Step 212: The terminal device transmits data based on a plurality of networks after accessing the plurality of networks.

In this embodiment of the present disclosure, after the terminal device accesses the plurality of networks, the terminal device may transmit data based on the plurality of networks. Since a network speed of the plurality of networks may be a sum of network speeds of the plurality of networks, multi-network acceleration can be implemented.

It should be noted that FIG. 13 in the foregoing embodiment of the present disclosure is illustrated with reference to FIG. 2. In a specific implementation, FIG. 13 may be further illustrated with reference to any other figures (such as FIG. 5, FIG. 6, FIG. 10, and FIG. 11).

Optionally, in this embodiment of the present disclosure, when the foregoing target interface includes a first control, a control interface of the terminal device may display a switch of the foregoing first wireless local area network and switches of the foregoing M second wireless local area networks. The switches are used as shortcut switches, which are convenient for the user to operate.

The control interface may be a shortcut menu interface corresponding to a control center of the terminal device. For example, the control interface may be a slide-up menu interface, a drop-down menu interface, or any other possible menu interface, which may be determined according to actual usage requirements and is not limited in this embodiment of the present disclosure.

It should be noted that the switches may be displayed in the form of switch icons, switch controls, or the like, or may be displayed in any other form that meets actual use requirements, which may be determined according to actual use requirements and is not limited in this embodiment of the present disclosure.

In this embodiment of the present disclosure, when only one WLAN shortcut switch is displayed in a traditional control interface, M auxiliary WLAN shortcut switches may be added in the interface corresponding to a switch of the foregoing dual band WLAN acceleration. To distinguish between a primary WLAN and an auxiliary WLAN, the primary WLAN maintains a traditional icon style, and the auxiliary WLAN icon has an  (auxiliary network) identifier in the upper right corner.

Figure 14:
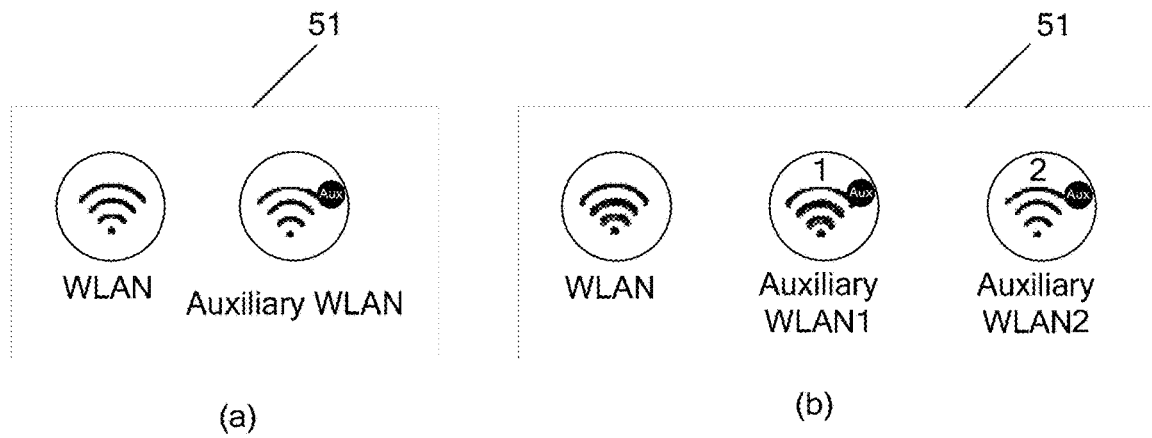
FIG. 14 is a seventh schematic diagram of an interface to which a multi-network access method is applied, according to an embodiment of the present disclosure.

As shown in (a) of FIG. 14, a shortcut switch of a primary WLAN and a shortcut switch of an auxiliary WLAN are displayed in a control interface 51, which correspond to the switch of the dual band WLAN acceleration in (b) of FIG. 3.

As shown in (b) of FIG. 14, a shortcut switch of the primary WLAN and shortcut switches of two auxiliary WLANs are displayed in the control interface 51. To distinguish between an auxiliary WLAN1 and an auxiliary WLAN2, serial numbers (for example, 1 and 2) may be added to blank areas above the switch icons.

Figure 15:
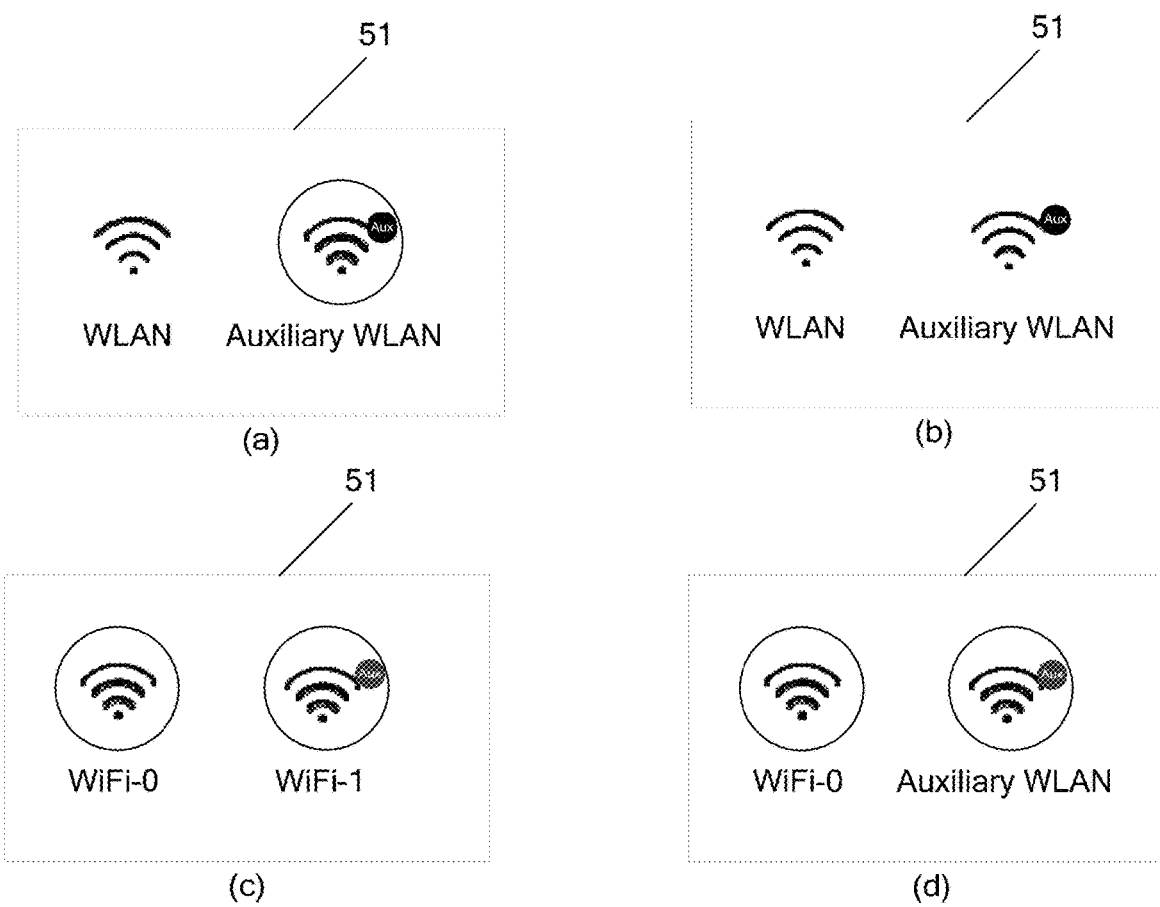
FIG. 15 is an eighth schematic diagram of an interface to which a multi-network access method is applied, according to an embodiment of the present disclosure.

When the shortcut switch of the primary WLAN is turned off, if the switch of the dual band WLAN acceleration is turned on, the display effect is shown in (a) of FIG. 15.

When the shortcut switch of the primary WLAN is turned off, if the switch of the dual band WLAN acceleration switch is turned off, the display effect is shown in (b) of FIG. 15.

When the primary WLAN and the auxiliary WLAN are successfully connected, a display effect is shown in (c) of FIG. 15. When the connection is successful, corresponding SSIDs will be displayed below the switch icons.

When the primary WLAN is successfully connected but the auxiliary WLAN fails to be connected, if the switch of the dual band WLAN acceleration is turned on, a display effect is shown in (d) of FIG. 15.

In this embodiment of the present disclosure, the switch of the primary WLAN and the switches of the auxiliary WLANs may be displayed to be convenient for the user to operate quickly, thereby improving human-computer interaction performance.

Optionally, in this embodiment of the present disclosure, when the foregoing target interface includes a first control, a signal strength identifier of the foregoing first wireless local area network and signal strength identifiers of the M second wireless local area networks may be displayed in a status bar of the terminal device.

Figure 16:
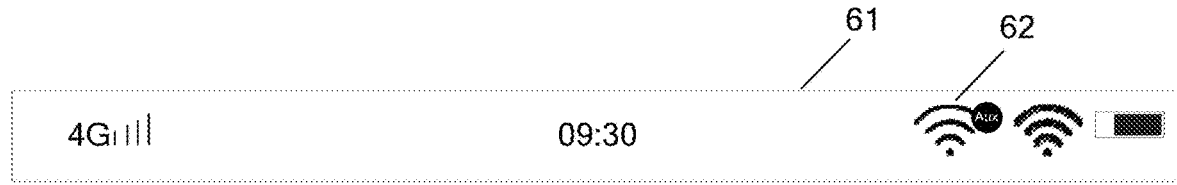
FIG. 16 is a ninth schematic diagram of an interface to which a multi-network access method is applied, according to an embodiment of the present disclosure.

As shown in FIG. 16, an icon 62 may be added in a status bar 61 to display information such as a connection status, signal strength, uplink and downlink data, and an access status of an auxiliary WLAN. When both the primary WLAN and the auxiliary WLAN are successfully connected, a display effect is shown in FIG. 16. The primary WLAN maintains a traditional icon style, and the auxiliary WLAN icon has an  (auxiliary network) identifier in the upper right corner.

Optionally, in this embodiment of the present disclosure, if the foregoing target interface includes a first control, a network speed value of the first wireless local area network and network speed values of the M second wireless local area networks may be displayed on a notification bar of a terminal device.

Figure 17:
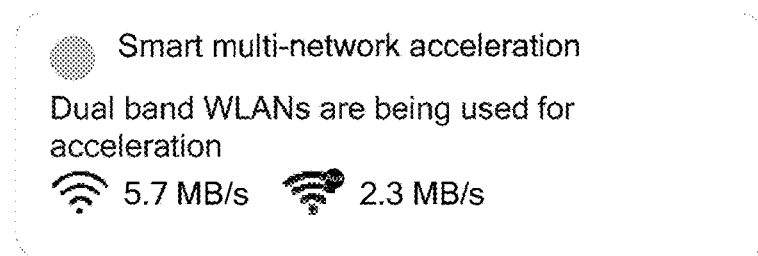
FIG. 17 is a tenth schematic diagram of an interface to which a multi-network access method is applied, according to an embodiment of the present disclosure.
Figure 17:
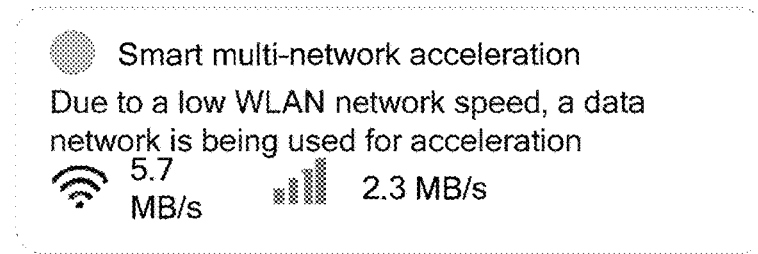
Figure 17:
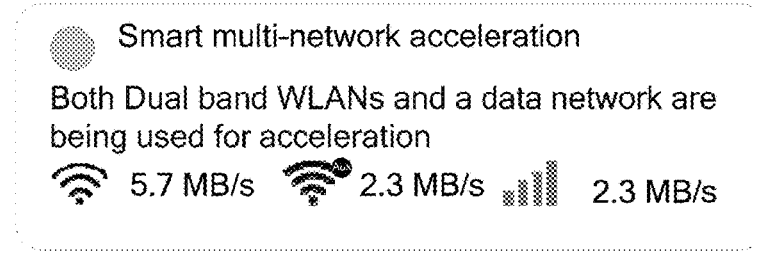

When dual band WLAN acceleration or data network acceleration takes effect, a real-time network speed of a currently accessed network will be displayed in a system notification bar. When the dual band WLAN acceleration takes effect, a display effect is shown in (a) of FIG. 17. When the data network acceleration takes effect, a display effect is shown in (b) FIG. 17. When both the dual band WLAN acceleration and data network acceleration take effect, a display effect is shown in (c) of FIG. 17.

An embodiment of the present disclosure provides the user with a convenient and quick solution for dual band WLAN operation and status acquisition. The user may trigger connection and disconnection of dual band WLAN through WLAN settings and a control center, and obtain a status, a signal strength, an acceleration effect, and the like of the dual band WLANs through a status bar and a system notification.

Optionally, in this embodiment of the present disclosure, when the target interface includes a second control, a switch of the first wireless local area network and switches of the N mobile data networks may be displayed in a control interface of the terminal device.

Optionally, in this embodiment of the present disclosure, when the target interface includes the second control, a signal strength identifier of the first wireless local area network and signal strength identifiers of the N mobile data networks may be displayed in a status bar of the terminal device.

Optionally, in this embodiment of the present disclosure, when the target interface includes the second control, a network speed value of the first wireless local area network and network speed values of the N mobile data networks may be displayed on a notification bar of the terminal device.

When the target interface includes the second control, for description of the display content in the control interface, status bar, and notification bar, the description of the control interface is used as a reference, status bar, and notification in the foregoing method embodiment when the target interface includes the first control. Details are not described herein again.

In this embodiment of the present disclosure, by expanding the WLAN settings, control interface, status bar, and notification bar, it is possible to greatly facilitate user operations and obtain information about dual band WLANs.

Optionally, in this embodiment of the present disclosure, multi-network access may further be implemented through AI voice control, designated gesture trajectories on a main screen, and the like, which can improve human-computer interaction performance.

The embodiment of the present disclosure is intended to provide a UI interaction solution for a plurality of WLANs.

Through expansion and support of dual band WLANs in the WLAN settings, control center, status bar, and system notifications, the user may operate a plurality of WLANs more conveniently and quickly, greatly improving UI interaction experience of the plurality of WLANs and making them more user-friendly.

Figure 18:
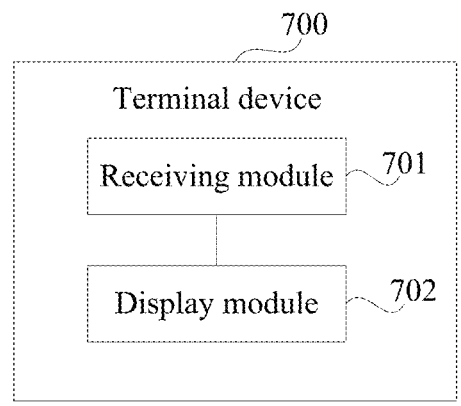
FIG. 18 is a first schematic structural diagram of a terminal device according to an embodiment of the present disclosure.

As shown in FIG. 18, an embodiment of the present disclosure provides a terminal device 700. The terminal device 700 may include a receiving module 701 and a display module 702. The receiving module 701 is configured to receive a first input for a network acceleration identifier by a user. The network acceleration identifier is an entrance for triggering the terminal device to access a network. The display module 702 is configured to display a target interface in response to the first input received by the receiving module 701. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on a plurality of accessed networks is greater than that based on the first wireless local area network, and M and N are both positive integers.

Figure 19:
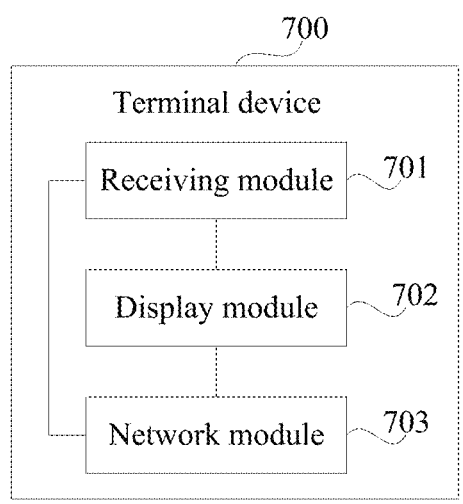
FIG. 19 is a second schematic structural diagram of a terminal device according to an embodiment of the present disclosure.

Optionally, with reference to FIG. 18, as shown in FIG. 19, a terminal device provided in this embodiment of the present disclosure may further include a network module 703. When the target interface includes a first control, a receiving module 701 is further configured to receive a second input for the first control by the user after a display module 702 displays the target interface and in a case that the terminal device accesses a first wireless local area network. The network module 703 is configured to access the M second wireless local area networks in response to the second input received by the receiving module 701. The M second wireless local area networks are top M wireless local area networks among detected wireless local area networks in descending order of network signal strengths.

Optionally, in this embodiment of the present disclosure, when the target interface includes the first control, the receiving module 701 is further configured to receive a third input for the first control by the user after the display module 702 displays the target interface and in a case that the terminal device accesses the first wireless local area network. The display module 702 is configured to display K wireless local area network identifiers in response to the third input received by the receiving module 701. Each wireless local area network identifier is used to indicate one wireless local area network. The receiving module 701 is further configured to receive a fourth input, by the user, for M wireless local area network identifiers among the K wireless local area network identifiers. The network module 703 is configured to access, in response to the fourth input received by the receiving module 701, wireless local area networks indicated by the M wireless local area network identifiers. The M second wireless local area networks may be wireless local area networks indicated by the M wireless local area network identifiers. K may be a positive integer greater than or equal to M.

Optionally, in this embodiment of the present disclosure, when the target interface includes a second control, the receiving module 701 is configured to receive a fifth input for the second control by the user after the display module 702 displays the target interface and in a case that the terminal device accesses a first wireless local area network.

The network module is configured to access the foregoing N mobile data networks in response to the fifth input received by the receiving module 701.

Optionally, in this embodiment of the present disclosure, when the target interface includes the first control and the second control, the receiving module 701 is configured to receive a sixth input for the first control and the second control by the user after the display module 702 displays the target interface and in a case that the terminal device accesses a first wireless local area network. The network module 703 is configured to access the foregoing M second wireless local area networks and the foregoing N mobile data networks in response to the sixth input received by the receiving module 701.

Optionally, in this embodiment of the present disclosure, the network module 703 is further configured to transmit data based on a plurality of networks after the terminal device accesses the plurality of networks.

Optionally, in this embodiment of the present disclosure, when the foregoing target interface includes a first control, the terminal device may further include at least one of the following display contents:

(1) a switch of the first wireless local area network and switches of the M second wireless local area networks displayed in a navigation interface;

(2) a signal strength identifier of the first wireless local area network and signal strength identifiers of the M second wireless local area networks displayed in a status bar; or (3) a network speed value of the first wireless local area network and network speed values of the M second wireless local area networks displayed in a notification bar.

Optionally, in this embodiment of the present disclosure, when the foregoing target interface includes a second control, the terminal device may further include at least one of the following display contents:

(1) a switch of the first wireless local area network and switches of the N mobile data networks displayed in a control interface;

(2) a signal strength identifier of the first wireless local area network and signal strength identifiers of the N mobile data networks displayed in a status bar; or (3) a network speed value of the first wireless local area network and network speed values of the N mobile data networks displayed in a notification bar.

The terminal device provided according to this embodiment of the present disclosure can implement processes implemented by the terminal device in the foregoing method embodiments. To avoid repetition, details are not described herein again.

The terminal device provided according to this embodiment of the present disclosure may receive a first input for a network acceleration identifier by the user. The network acceleration identifier is an entrance for triggering the terminal device to access a network. A target interface is displayed in response to the first input. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on a plurality of accessed networks is greater than that based on the first wireless local area network, and M and N are both positive integers. The embodiments of the present disclosure are expanded and supported in current WLAN settings. Specifically, an entrance identifier for triggering multi-network acceleration is added, so that the user may input the entrance identifier to trigger the terminal device to access a plurality of networks. In this solution, in a case that the terminal device accesses a primary WLAN, if the user triggers the terminal device to perform multi-network acceleration, the terminal device that accesses the primary WLAN may access M auxiliary WLAN and/or N mobile data networks, so that the terminal device may transmit data through a plurality of accessed networks, realizing multi-network acceleration. In this way, through the embodiments of the present disclosure, a data transmission speed during interaction between the terminal device and a network can be increased.

Figure 20:
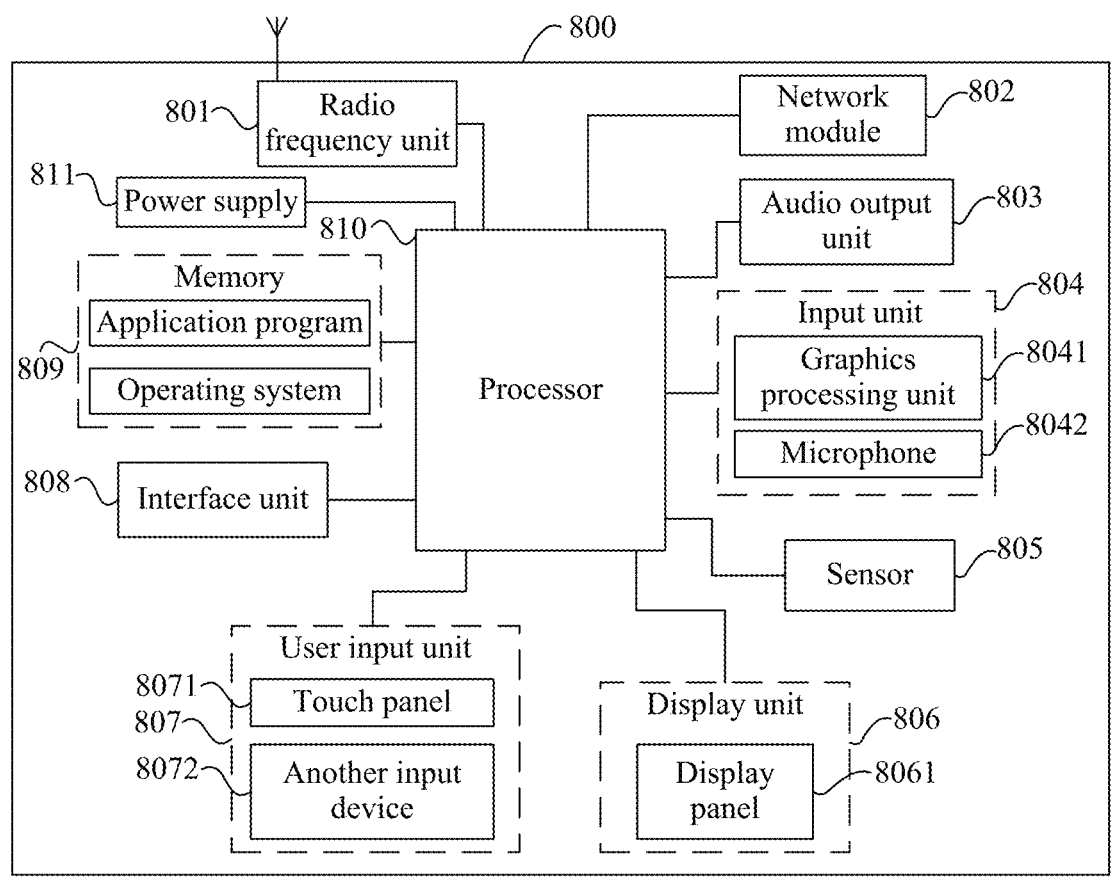
FIG. 20 is a schematic diagram of hardware of a terminal device according to an embodiment of the present disclosure.

FIG. 20 is a schematic diagram of a hardware structure of a terminal device according to embodiments of the present disclosure. As shown in FIG. 20, a terminal device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the terminal device shown in FIG. 20 does not constitute a limitation to the terminal device, and the terminal device may include more or fewer components than those shown in the figure, a combination of some components, or different component arrangements. In an embodiment of the present disclosure, the terminal device includes, but is not limited to, a mobile phone, a tablet computer, a notebook computer, a palmtop computer, a vehicle-mounted terminal, a wearable device, a pedometer, or the like.

The user input unit 807 is configured to receive a first input for a network acceleration identifier by the user. The network acceleration identifier is an entrance for triggering the terminal device to access a network. The display unit 806 is configured to display a target interface in response to the first input received by the user input unit 807. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on a plurality of accessed networks is greater than that based on the first wireless local area network, and M and N are both positive integers.

An embodiment of the present disclosure provides a terminal device. The terminal device may receive a first input for a network acceleration identifier by the user. The network acceleration identifier is an entrance for triggering the terminal device to access a network. The target interface is displayed in response to the first input. The target interface includes at least one of a first control or a second control. The first control is configured to trigger the terminal device to access M second wireless local area networks in a case that a first wireless local area network is accessed. The second control is configured to trigger the terminal device to access N mobile data networks in a case that the first wireless local area network is accessed. A data transmission speed based on t plurality of accessed networks is greater than that based on the first wireless local area network, and M and N are both positive integers. The embodiments of the present disclosure are expanded and supported in current WLAN settings. Specifically, an entrance identifier for triggering multi-network acceleration is added, so that the user may input the entrance identifier to trigger the terminal device to access a plurality of networks. In this solution, in a case that the terminal device accesses a primary WLAN, if the user triggers the terminal device to perform multi-network acceleration, the terminal device that accesses the primary WLAN may access M auxiliary WLAN and/or N mobile data networks, so that the terminal device may access a plurality of networks, realizing multi-network acceleration. In this way, through the embodiments of the present disclosure, a data transmission speed during interaction between the terminal device and a network can be increased.

It should be understood that in the embodiments of the present disclosure, the radio frequency unit 801 may be configured to receive and transmit information, or receive and transmit signals during a call. Specifically, the radio frequency unit 801 is configured to receive downlink data from a base station, and transmit the downlink data to the processor 810 for processing; and in addition, transmit the uplink data to the base station. Generally, the radio frequency unit 801 includes, but is not limited to, an antenna, at least one amplifier, a transceiver, a coupler, a low noise amplifier, and a duplexer, and the like. In addition, the radio frequency unit 801 may further communicate with a network and another device through a wireless communications system.

The terminal device 800 provides wireless broadband Internet access for the user by using the network module 802, for example, helping the user send and receive an e-mail, browse a web page, and access streaming media.

The audio output unit 803 may convert audio data received by the radio frequency unit 801 or the network module 802 or stored in the memory 809 into an audio signal, and output the audio signal as sound. In addition, the audio output unit 803 may further provide audio output (for example, a call signal receiving sound or a message receiving sound) related to a specific function performed by the terminal device 800. The audio output unit 803 includes a loudspeaker, a buzzer, a receiver, and the like.

The input unit 804 is configured to receive audio or video signals. The input unit 804 may include a graphics processing unit (graphics processing unit, GPU) 8041 and a microphone 8042. The graphics processing unit 8041 processes image data of a still picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a telephone call mode, into a format that can be sent to a mobile communication base station via the radio frequency unit 801 for output.

The terminal device 800 further includes at least one sensor 805, such as a light sensor, a motion sensor, and another sensor. Specifically, the light sensor includes an ambient light sensor and a proximity sensor. The ambient light sensor may adjust luminance of a display panel 8061 based on brightness of ambient light. The proximity sensor may turn off the display panel 8061 and/or backlight when the terminal device 800 approaches an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as horizontal and vertical screen switch, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information inputted by the user or information provided to the user. The display unit 806 may include the display panel 8061. The display panel 8061 may be configured in a form of a liquid crystal display (liquid crystal display, LCD), an organic light-emitting diode (organic light-emitting diode, OLED), or the like.

The user input unit 807 may be configured to receive input digit or character information and generate key signal input related to user setting and function control of the terminal device. Specifically, the user input unit 807 includes a touch panel 8071 and another input device 8072. The touch panel 8071 is also referred to as a touchscreen, and may collect a touch operation performed by the user on or near the touch panel 8071 (such as an operation performed by the user on or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and receives and executes a command sent by the processor 810. In addition, the touch panel 8071 may be implemented as a resistive type, a capacitive type, an infrared type, a surface acoustic wave type, or the like. The user input unit 807 may further include another input device 8072 in addition to the touch panel 8071. Specifically, the another input device 8072 may include but is not limited to a physical keyboard, a function button (such as a volume control button or a power on/off button), a trackball, a mouse, a joystick, or the like. Details are not described herein.

Further, the touch panel 8071 may cover the display panel 8061. When detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. Although in FIG. 20, the touch panel 8071 and the display panel 8061 are configured as two independent components to implement input and output functions of the terminal device, in some embodiments, the touch panel 8071 and the display panel 8061 may be integrated to implement input and output functions of the terminal device. Details are not limited herein.

The interface unit 808 is an interface for connecting an external apparatus to the terminal device 800. For example, the external apparatus may include a wired or wireless headset port, an external power supply (or a battery charger) port, a wired or wireless data port, a storage card port, a port configured to connect to an apparatus having an identification module, an audio input/output (I/O) port, a video I/O port, a headset port, and the like. The interface unit 808 may be configured to receive an input (for example, data information and power) from the external apparatus and transmit the received input to one or more elements in the terminal device 800, or transmit data between the terminal device 800 and the external apparatus.

The memory 809 may be configured to store a software program as well as various types of data. The memory 809 may mainly include a program storage area and a data storage area. The program storage area may store an operating system, an application program required for at least one function (such as a sound play function and an image play function), and the like. The data storage area may store data created based on use of a mobile phone (such as audio data and a phone book), and the like. In addition, the memory 809 may include a high-speed random access memory, and may further include a non-volatile memory such as at least one magnetic disk storage device, a flash memory device, or another volatile solid-state storage device.

The processor 810 is a control center of the terminal device. The processor 810 uses various interfaces and lines to connect all parts of the entire terminal device, and performs various functions and data processing of the terminal device by running or executing the software program and/or module stored in the memory 809 and invoking data stored in the memory 809, thereby performing overall monitoring on the terminal device. The processor 810 may include one or more processing units. Optionally, an application processor and a modem processor may be integrated into the processor 810. The application processor mainly processes an operating system, a user interface, an application program, and the like. The modem processor mainly processes wireless communications. It can be understood that, alternatively, the modem processor may not be integrated into the processor 810.

The terminal device 800 may further include the power supply 811 (such as a battery) that supplies power to each component. Optionally, the power supply 811 may be logically connected to the processor 810 by using a power management system, to implement functions such as charging, discharging, and power consumption management by using the power management system.

In addition, the terminal device 800 includes some functional modules that are not shown. Details are not described herein.

Optionally, an embodiment of the present disclosure further provides a terminal device, including, as shown in FIG. 20, a processor 810, a memory 809, and a computer program that is stored in the memory 809 and may run on the processor 810. When the computer program is executed by the processor 810, processes of the foregoing method embodiments can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, processes of the foregoing method embodiments can be implemented, and a same technical effect can be achieved. To avoid repetition, details are not described herein. The non-transitory computer-readable storage medium may include a read-only memory (read-only memory, ROM), a random access memory (random access memory, RAM), a magnetic disk, an optical disc, or the like.

It should be noted that, in this specification, the terms "comprise", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the procedure, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

The invention claimed is:

1. A multi-network access method, wherein, the method is applied to a terminal device and comprises:
    receiving a first input for a network acceleration identifier by a user, wherein the network acceleration identifier is an entrance for triggering the terminal device to access a network; and
    displaying a target interface in response to the first input, wherein the target interface comprises at least one of a first control or a second control, wherein the first control is configured to trigger the terminal device to access M second wireless local area networks in a case that that a first wireless local area network is accessed, and the second control is configured to trigger the terminal device to access N mobile data networks in a case that that the first wireless local area network is accessed, wherein
    a data transmission speed based on a plurality of accessed networks is greater than that based on the first wireless local area network, and M and N are positive integers.

2. The method according to claim 1, wherein the target interface comprises the first control; and
    after the displaying a target interface, the method further comprises:
    in a case that the terminal device accesses the first wireless local area network, receiving a second input for the first control by the user; and
    in response to the second input, accessing the M second wireless local area networks, wherein
    the M second wireless local area networks are top M wireless local area networks among detected wireless local area networks in descending order of network signal strengths.

3. The method according to claim 1, wherein the target interface comprises the first control; and
    after the displaying a target interface, the method further comprises:
    in a case that the terminal device accesses the first wireless local area network, receiving a third input for the first control by the user;
    in response to the third input, displaying K wireless local area network identifiers, wherein each wireless local area network identifier is used to indicate one wireless local area network;
    receiving a fourth input, by the user, for M wireless local area network identifiers among the K wireless local area network identifiers; and
    in response to the fourth input, accessing wireless local area networks indicated by the M wireless local area network identifiers, wherein
    the M second wireless local area networks are the wireless local area networks indicated by the M wireless local area network identifiers and K is a positive integer greater than or equal to M.

4. The method according to claim 1, wherein the target interface comprises the second control; and
    after the displaying a target interface, the method further comprises:
    in a case that the terminal device accesses the first wireless local area network, receiving a fifth input for the second control by the user; and
    in response to the fifth input, accessing the N mobile data networks.

5. The method according to claim 1, wherein the target interface comprises the first control and the second control; and
    after the displaying a target interface, the method further comprises:
    in a case that the terminal device accesses the first wireless local area network, receiving a six input for the first control and the second control by the user; and
    in response to the sixth input, accessing the M second wireless local area networks and the N mobile data networks.

6. The method according to claim 1, wherein the method further comprises:
    after the terminal device accesses a plurality of networks, transmitting data based on the plurality of networks.

7. The method according to claim 1, wherein in a case that the target interface comprises the first control, the terminal device further comprises at least one of the following display contents:
    a switch of the first wireless local area network and switches of the M second wireless local area networks displayed in a navigation interface;
    a signal strength identifier of the first wireless local area network and signal strength identifiers of the M second wireless local area networks displayed in a status bar; or
    a network speed value of the first wireless local area network and network speed values of the M second wireless local area networks displayed in a notification bar.

8. The method according to claim 1, wherein in a case that the target interface comprises the second control, the terminal device further comprises at least one of the following display contents:
    a switch of the first wireless local area network and switches of the N mobile data networks displayed in a control interface;

a signal strength identifier of the first wireless local area network and signal strength identifiers of the N mobile data networks displayed in a status bar; or a network speed value of the first wireless local area network and network speed values of the N mobile data networks displayed in a notification bar.

9. A terminal device, comprising:

a touch panel, configured to receive, from a user, a first input for a network acceleration identifier, wherein the network acceleration identifier is an entrance for triggering the terminal device to access a network; and a display panel, configured to display a target interface in response to the first input, wherein the target interface comprises at least one of a first control or a second control, wherein the first control is configured to trigger the terminal device to access M second wireless local area networks in a case that that a first wireless local area network is accessed, and the second control is configured to trigger the terminal device to access N mobile data networks in a case that that the first wireless local area network is accessed, wherein a data transmission speed based on a plurality of accessed networks is greater than that based on the first wireless local area network, and M and N are positive integers.

10. The terminal device according to claim 9, wherein the target interface comprises the first control; and the touch panel is further configured to receive, from the user, a second input for the first control after the display panel displays the target interface and in a case that the terminal device accesses the first wireless local area network, wherein the second input is configured to trigger the terminal device to access the M second wireless local area networks, wherein the M second wireless local area networks are top M wireless local area networks among detected wireless local area networks in descending order of network signal strengths.

11. The terminal device according to claim 9, wherein the target interface comprises the first control; and the touch panel is further configured to receive, from the user, a third input for the first control after the display panel displays the target interface and in a case that the terminal device accesses the first wireless local area network; and the display panel is further configured to display K wireless local area network identifiers in response to the third input, wherein each wireless local area network identifier is used to indicate one wireless local area network;

the touch panel is further configured to receive, from the user, a fourth input, for M wireless local area network identifiers among the K wireless local area network identifiers, wherein the forth input is configured to trigger the terminal device to access wireless local area networks indicated by the M wireless local area network identifiers;

wherein the M second wireless local area networks are the wireless local area networks indicated by the M wireless local area network identifiers and K is a positive integer greater than or equal to M.

12. The terminal device according to claim 9, wherein the target interface comprises the second control; and the touch panel is further configured to receive, from the user, a fifth input for the second control after the display panel displays the target interface and in a case that the terminal device accesses the first wireless local area network, wherein the fifth input is configured to trigger the terminal device to access the N mobile data networks.

13. The terminal device according to claim 9, wherein the target interface comprises the first control and the second control; and the touch panel is further configured to receive, from the user, a sixth input for the first control and the second control after the display panel displays the target interface and in a case that the terminal device accesses the first wireless local area network, wherein the sixth input is configured to trigger the terminal device to access the M second wireless local area networks and the N mobile data networks.

14. The terminal device according to claim 9, wherein the terminal device further comprises:

an antenna, configured to transmit data based on the plurality of networks after the terminal device accesses a plurality of networks.

15. The terminal device according to claim 9, wherein in a case that the target interface comprises the first control, the display panel is further configured to display at least one of the following display contents:

a switch of the first wireless local area network and switches of the M second wireless local area networks displayed in a navigation interface;

a signal strength identifier of the first wireless local area network and signal strength identifiers of the M second wireless local area networks displayed in a status bar; or a network speed value of the first wireless local area network and network speed values of the M second wireless local area networks displayed in a notification bar.

16. The terminal device according to claim 9, wherein in a case that the target interface comprises the second control, the display panel is further configured to display at least one of the following display contents:

a switch of the first wireless local area network and switches of the N mobile data networks displayed in a control interface;

a signal strength identifier of the first wireless local area network and signal strength identifiers of the N mobile data networks displayed in a status bar; or a network speed value of the first wireless local area network and network speed values of the N mobile data networks displayed in a notification bar.

17. A non-transitory computer-readable storage medium, wherein the non-transitory computer-readable storage medium stores a computer program, and when the computer program is executed by a processor, the following steps are implemented:

receiving a first input for a network acceleration identifier by a user, wherein the network acceleration identifier is an entrance for triggering the terminal device to access a network; and displaying a target interface in response to the first input, wherein the target interface comprises at least one of a first control or a second control, wherein the first control is configured to trigger the terminal device to access M second wireless local area networks in a case that that a first wireless local area network is accessed, and the second control is configured to trigger the terminal device to access N mobile data networks in a case that that the first wireless local area network is accessed, wherein a data transmission speed based on a plurality of accessed networks is greater than that based on the first wireless local area network, and M and N are positive integers.

18. The non-transitory computer-readable storage medium according to claim 17, wherein the target interface comprises the first control; and
after the displaying a target interface, when the computer program is executed by the processor, the following steps are implemented:
in a case that the terminal device accesses the first wireless local area network, receiving a second input for the first control by the user; and
in response to the second input, accessing the M second wireless local area networks, wherein
the M second wireless local area networks are top M wireless local area networks among detected wireless local area networks in descending order of network signal strengths.

19. The non-transitory computer-readable storage medium according to claim 17, wherein the target interface comprises the first control; and
after the displaying a target interface, when the computer program is executed by the processor, the following steps are implemented:
in a case that the terminal device accesses the first wireless local area network, receiving a third input for the first control by the user;
in response to the third input, displaying K wireless local area network identifiers, wherein each wireless local area network identifier is used to indicate one wireless local area network;
receiving a fourth input, by the user, for M wireless local area network identifiers among the K wireless local area network identifiers; and
in response to the fourth input, accessing wireless local area networks indicated by the M wireless local area network identifiers, wherein
the M second wireless local area networks are the wireless local area networks indicated by the M wireless local area network identifiers and K is a positive integer greater than or equal to M.

20. The non-transitory computer-readable storage medium according to claim 17, wherein the target interface comprises the second control; and
after the displaying a target interface, when the computer program is executed by the processor, the following steps are implemented:
in a case that the terminal device accesses the first wireless local area network, receiving a fifth input for the second control by the user; and
in response to the fifth input, accessing the N mobile data networks.

* * * * *